United States Patent
Tsukamoto et al.

(10) Patent No.: US 8,640,810 B2
(45) Date of Patent: Feb. 4, 2014

(54) CONTROL DEVICE OF ELECTRIC MOTORCYCLE

(75) Inventors: Tomohiro Tsukamoto, Wako (JP); Takashi Tominaga, Wako (JP); Kazumi Shibata, Wako (JP); Hisao Nishiura, Wako (JP); Seiji Kato, Wako (JP); Susumu Akutsu, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/819,412

(22) PCT Filed: Jul. 19, 2011

(86) PCT No.: PCT/JP2011/066359
§ 371 (c)(1),
(2), (4) Date: Feb. 27, 2013

(87) PCT Pub. No.: WO2012/029423
PCT Pub. Date: Mar. 8, 2012

(65) Prior Publication Data
US 2013/0161107 A1    Jun. 27, 2013

(30) Foreign Application Priority Data

Aug. 31, 2010 (JP) .................................. 2010-195035

(51) Int. Cl.
*B62K 11/00* (2013.01)
*B62M 6/00* (2010.01)

(52) U.S. Cl.
USPC ............................ 180/220; 180/227; 180/228

(58) Field of Classification Search
USPC ......................................... 180/220, 227, 228
See application file for complete search history.

(56) References Cited

U.S. PATENT DOCUMENTS

| 5,765,671 | A | 6/1998 | Endo et al. |
| 5,853,058 | A | 12/1998 | Endo et al. |
| 7,210,550 | B2 * | 5/2007 | Yonehana et al. ............. 180/220 |
| 8,002,067 | B2 * | 8/2011 | Nishiura et al. .............. 180/220 |
| 8,443,926 | B2 * | 5/2013 | Kanno et al. .................. 180/220 |
| 2004/0079574 | A1 | 4/2004 | Ono et al. |
| 2005/0177285 | A1 * | 8/2005 | Honda ............................ 701/22 |
| 2011/0139531 | A1 | 6/2011 | Kanno et al. |

FOREIGN PATENT DOCUMENTS

| JP | H0872780 A | 3/1996 |
| JP | 2000-142529 A | 5/2000 |
| JP | 2004-352208 A | 12/2004 |
| JP | 2008-221976 A | 9/2008 |
| JP | 2010-067422 A | 3/2010 |
| JP | 2010-083363 A | 4/2010 |
| TW | 326426 | 2/1998 |
| TW | 201018593 A | 5/2010 |

* cited by examiner

*Primary Examiner* — Kevin Hurley
*Assistant Examiner* — Marc A Scharich
(74) *Attorney, Agent, or Firm* — Birch, Stewart, Kolasch & Birch, LLP

(57) ABSTRACT

A battery is disposed close to a through-hole of a swing shaft that pivotally supports a swing arm on a vehicle body frame so as to be freely swingable at a position closer to the front of the vehicle body in the swing arm. An electric motor is disposed close to an axle of a rear wheel at a position closer to the rear of the vehicle body in the swing arm. The control board is disposed at a position outside of the battery in the vehicle width direction, and the heating element board is disposed at a position rearward of the vehicle body with respect to the control board and forward of the vehicle body with respect to the motor.

12 Claims, 11 Drawing Sheets

CONTROL DEVICE OF ELECTRIC MOTORCYCLE

TECHNICAL FIELD

The present invention relates to a control device of an electric motorcycle, and particularly, relates to a control device of an electric motorcycle that drives a motor serving as a power source by electric power supplied from an in-vehicle battery.

BACKGROUND ART

Conventionally, in electric motorcycles that run using motors as power sources, optimal placement of batteries, control units, etc., to drive the motors has been studied.

Patent Document 1 discloses an electric motorcycle for which a battery, a control unit, a motor, etc., are equipped inside of a swing arm (unit swing) that pivotally supports a rear wheel serving as a drive wheel, and the swing arm is freely swingably attached to a lower portion of a vehicle body (refer to FIG. 1). The swing arm is a cantilever type that supports the rear wheel by an arm provided on the left side in the vehicle width direction, and also has a long shape extending forward further than a rider's footrest step at a vehicle-body front end portion thereof

CITATION LIST

Patent Literature

Patent Document 1: Japanese Published Unexamined Patent Application No. 2008-221976

SUMMARY OF INVENTION

Technical Problem

Meanwhile, components of the control unit include ones, such as a capacitor and a DC/DC converter to be used when supplying a current from the battery to the motor, that have large calorific values because a large current flows therethrough, and with regard to such heating elements, it is desirable to secure heat dissipation in consideration of the influence on other components. However, it has been disclosed, in the electric motorcycle described in Patent Document 1, to dispose the control unit in the swing arm, but there has been no study concerning a specific location of arrangement of the heating elements. Further, in a motorcycle having a small extra space, it is also demanded to increase heat dissipation of heating elements while increasing the placement efficiency of respective components.

An object of the present invention is to solve the problem of the conventional technique described above and provide a control device of an electric motorcycle that is increased in heat dissipation of heating elements included in the control unit and is also increased in placement efficiency.

Solution to Problem

To achieve the above objects, the present invention has a first feature in that a control device of an electric motorcycle for which inside of a swing arm (30) that pivotally supports a rear wheel (WR) of the electric motorcycle (1) and that is freely swingably attached to a vehicle body, a battery (56) and an electric motor (M) for driving the rear wheel (WR) are equipped, the swing arm (30) being a cantilever type that pivotally supports the rear wheel (WR) by a single arm portion (39), the battery (56) being disposed close to a through-hole (19a) of a swing shaft (19) that pivotally supports the swing arm (30) on a vehicle body frame (2) so as to be freely swingable at a position closer to the front of the vehicle body in the swing arm (30), and the electric motor (M) being disposed close to an axle (32) of the rear wheel (WR) at a position closer to the rear of the vehicle body in the swing arm (30), the control device of an electric motorcycle including a board (50) serving as a control device that is disposed with a planar portion oriented in a vehicle width direction, wherein the board (50) includes a control board (50a) which has a control element having a small calorific value and on which a drive circuit for controlling the electric motor (M) is disposed and a heating element board (50b) which has a heating element having a large calorific value and on which a charging circuit for charging the battery (56) is disposed, the control board (50a) is disposed at a position outside of the battery (56) in the vehicle width direction, and the heating element board (50b) is disposed at a position rearward with respect to the vehicle body than the control board (50a) and forward with respect to the vehicle body than the motor (M).

The present invention has a second feature in that the heating element board (50b) is disposed close to the control board (50a) on a side rearward of the vehicle body with respect to the control board (50a).

The present invention has a third feature in that the heating element is mounted on a surface that is inside of the vehicle body of the heating element board (50b).

The present invention has a fourth feature in that as a result of being mounted on a surface that is inside of the vehicle body of the heating element board (50b), the heating element is stored in a curved portion (40) that couples an outer shell portion of a storage space (35) for the battery (56) and the arm portion (39) with each other.

The present invention has a fifth feature in that the heating element board (50b) is disposed at a position to overlap with the rear wheel (WR) in a side view of the vehicle body.

The present invention has a sixth feature in that the battery (56) is formed in a substantially rectangular parallelepiped shape with its longitudinal direction oriented in the vehicle width direction, and the control board (50a), with its planar portion oriented in the vehicle width direction, is disposed close to one longitudinal end surface of the battery (56).

The present invention has a seventh feature in that the battery (56) is an assembly of laminate-type batteries where each cell is packed with a soft laminate sheet.

Advantageous Effects of Invention

According to the first feature, a swing arm being a cantilever type that pivotally supports a rear wheel by a single arm portion, a battery being disposed close to a through-hole of a swing shaft that pivotally supports the swing arm on a vehicle body frame so as to be freely swingable at a position closer to the front of the vehicle body in the swing arm, and an electric motor being disposed close to an axle of the rear wheel at a position closer to the rear of the vehicle body in the swing arm, a control device of an electric motorcycle including a board serving as a control device that is disposed with a planar portion oriented in a vehicle width direction, wherein the board includes a control board which has a control element having a small calorific value and on which a drive circuit for controlling the electric motor is disposed and a heating element board which has a heating element having a large calorific value and on which a charging circuit for charging the battery is disposed, the control board is disposed at a position outside of the battery in the vehicle width direction, and the heating element board is disposed at a position rearward with respect to the vehicle body than the control board and forward with respect to the vehicle body than the motor. Therefore, components having large calorific values out of the control components are aggregated, which allows a reduction in a heat load to other components. Moreover, heating elements can be efficiently arranged, taking advantage of a space formed between the battery and electric motor. Further, because the control board is arranged on the outside of the battery in the vehicle width direction, even when the control device is equipped inside of the swing arm, the swing arm can be prevented from having a long length in the front-rear direction of the vehicle body.

According to the second feature, the heating element board is disposed close to the control board on a side rearward of the vehicle body with respect to the control board. Therefore, effect of the thermal influence of the heating element on the control board located on the upstream side in the vehicle traveling direction can be prevented.

According to the third feature, the heating element is mounted on a surface that is inside of the vehicle body of the heating element board. Therefore, the heating element can be arranged, taking advantage of the dead space that is inside of the vehicle body of the swing arm. Moreover, when heating elements are mounted only on the surface that is inside of the vehicle body, because no heating elements project to the outside in the vehicle width direction, the dimension in the vehicle width direction of the swing arm can be reduced.

According to the fourth feature, as a result of being mounted on a surface that is inside of the vehicle body of the heating element board, the heating element is stored in a curved portion that couples an outer shell portion of a storage space for the battery and the arm portion with each other. Therefore, the heating element can be arranged, taking advantage of the interior space of the curved portion necessary for securing the joint strength of the arm portion. Accordingly, the dimension in the vehicle width direction of the swing arm can be reduced.

According to the fifth feature, the heating element board is disposed at a position to overlap with the rear wheel in a side view of the vehicle body. Therefore, heating elements can be disposed by utilizing the space formed between the battery and electric motor, without increasing the swing arm length longer than necessary.

According to the sixth feature, the battery is formed in a substantially rectangular parallelepiped shape with its longitudinal direction oriented in the vehicle width direction, and the control board, with its planar portion oriented in the vehicle width direction, is disposed close to one longitudinal end surface of the battery. Therefore, dead space can be reduced as a result of the battery and control board being disposed close to each other. Moreover, when a power supply terminal of the battery or a wiring terminal for voltage detection is provided at a longitudinal end portion, wiring or the like between the battery and control board can be shortened.

According to the seventh feature, the battery is an assembly of laminate-type batteries where each cell is packed with a soft laminate sheet. Therefore, an attaching operation to the swing arm and a battery replacement operation are facilitated.

DESCRIPTION OF EMBODIMENTS

Figure 1:
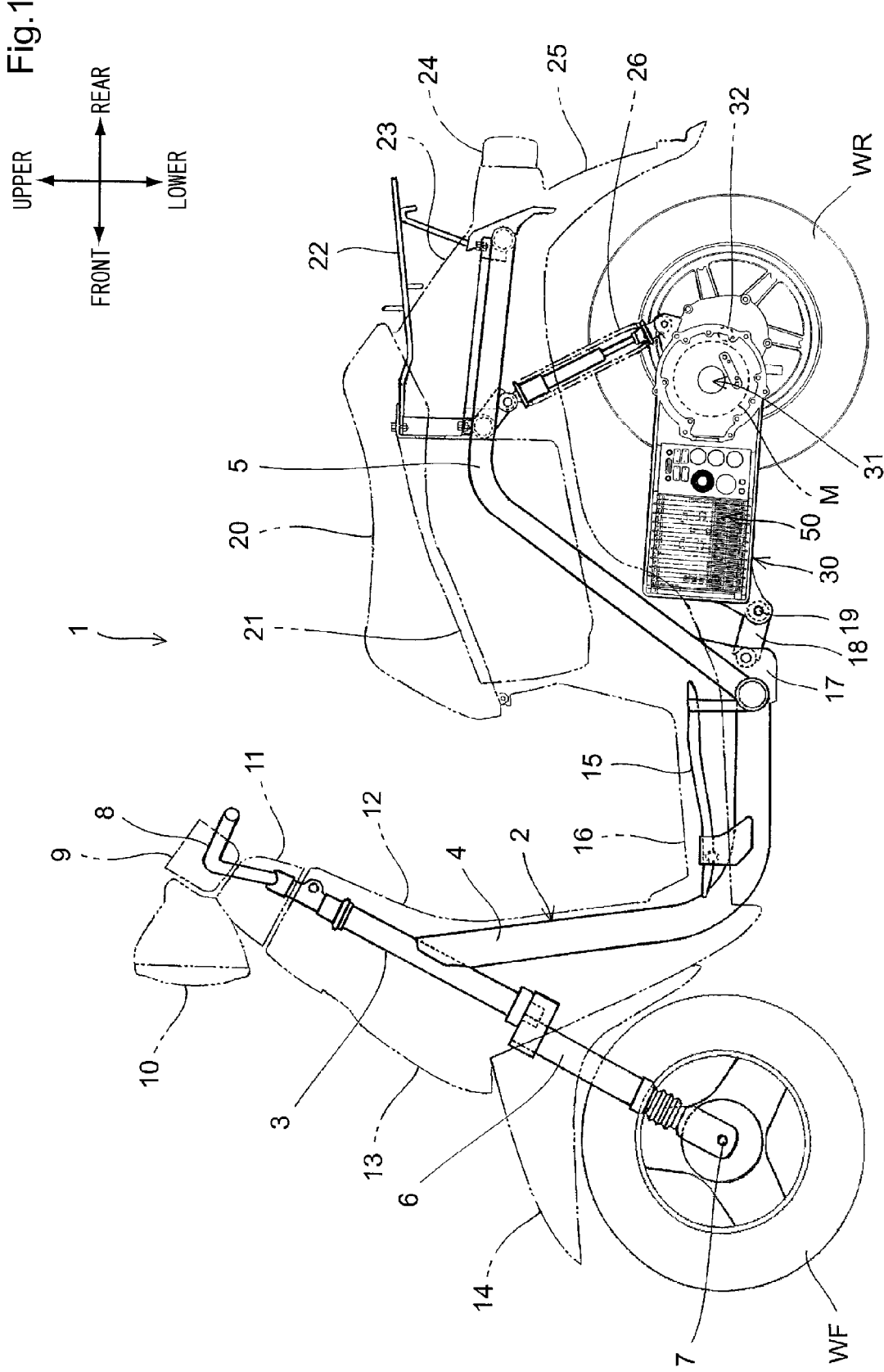
FIG. 1 is a side view of an electric motorcycle according to an embodiment of the present invention.

Hereinafter, preferred embodiments of the present invention will be described in detail with reference to the drawings. FIG. 1 is a side view of an electric motorcycle 1 according to an embodiment of the present invention. The electric motorcycle 1 is a scooter type saddle-type vehicle having a low floorboard 16, and drives a rear wheel WR by an electric motor M stored in a swing arm (unit swing) 30. To a front portion of a vehicle body frame 2, a head pipe 3 that pivotally supports a stem shaft (not shown) so as to be freely rotatable is joined. To an upper portion of the stem shaft, a steering handle 8 to be covered with a handle cover 11 is joined, and to a lower portion, on the other hand, a pair of left and right front forks 6 that pivotally support a front wheel WF so as to be freely turnable by an axle 7 are joined.

The vehicle body frame 2 includes a main pipe 4 extending downward from a rear portion of the head pipe 3 and a rear frame 5 coupled to a rear end portion of main pipe 4 and extending upward in a vehicle-body rear portion. To the main pipe 4 located under the low floorboard 16, a floor frame 15 that supports the low floorboard 16 is attached. Moreover, to a junction portion between the main pipe 4 and the rear frame 5, a pair of left and right pivot plates 17 are attached.

The swing arm 30 is a cantilever type having an arm portion at only the left side in the vehicle width direction, and is pivotally supported on the vehicle frame 2 so as to be freely swingable via a swing shaft 19 that penetrates through a link 18 attached to the pivot plate 17. The swing arm 30 is a partially hollow structure made of a metal such as aluminum, in which the electric motor M is stored near an axle 32, and a board 50 serving as a control device is arranged in front of the electric motor M in the vehicle body. A battery 56 (refer to FIG. 3) that supplies electric power to the electric motor M is arranged on the right side in the vehicle width direction of the board 50.

The rear wheel WR is pivotally supported on the swing arm 30 so as to be freely rotatable by the axle 32, and a rear end portion of the swing arm 30 is suspended from the rear frame 5 via a rear cushion 26. Moreover, under a seat 20, a storage box 21 to serve as a baggage locker space is disposed so as to be sandwiched by the pair of left and right rear frames 5.

The main pipe 4 of the vehicle body frame 2 is covered with a front cowl 13 on a side forward of the vehicle body and a leg shield 12 on a side rearward of the vehicle body. On the top of the handle cover 11, a meter device 9 is arranged, and at a side forward of the vehicle body with respect to the meter device 9, a headlight 10 is attached. To an upper portion of the front forks 6, a front fender 14 that covers the front wheel WF is fixed.

The outside of the rear frame 5 in the vehicle width direction is covered with a seat cowl 23, and a tail lamp device 24 is attached to a rear end portion of the seat cowl 23. Above the tail lamp device 24, a rear carrier 22 joined to the rear frame 5 projects, and below the tail lamp device 24, a rear fender 23 that covers the rear wheel WR from behind and above is provided.

Figure 2:
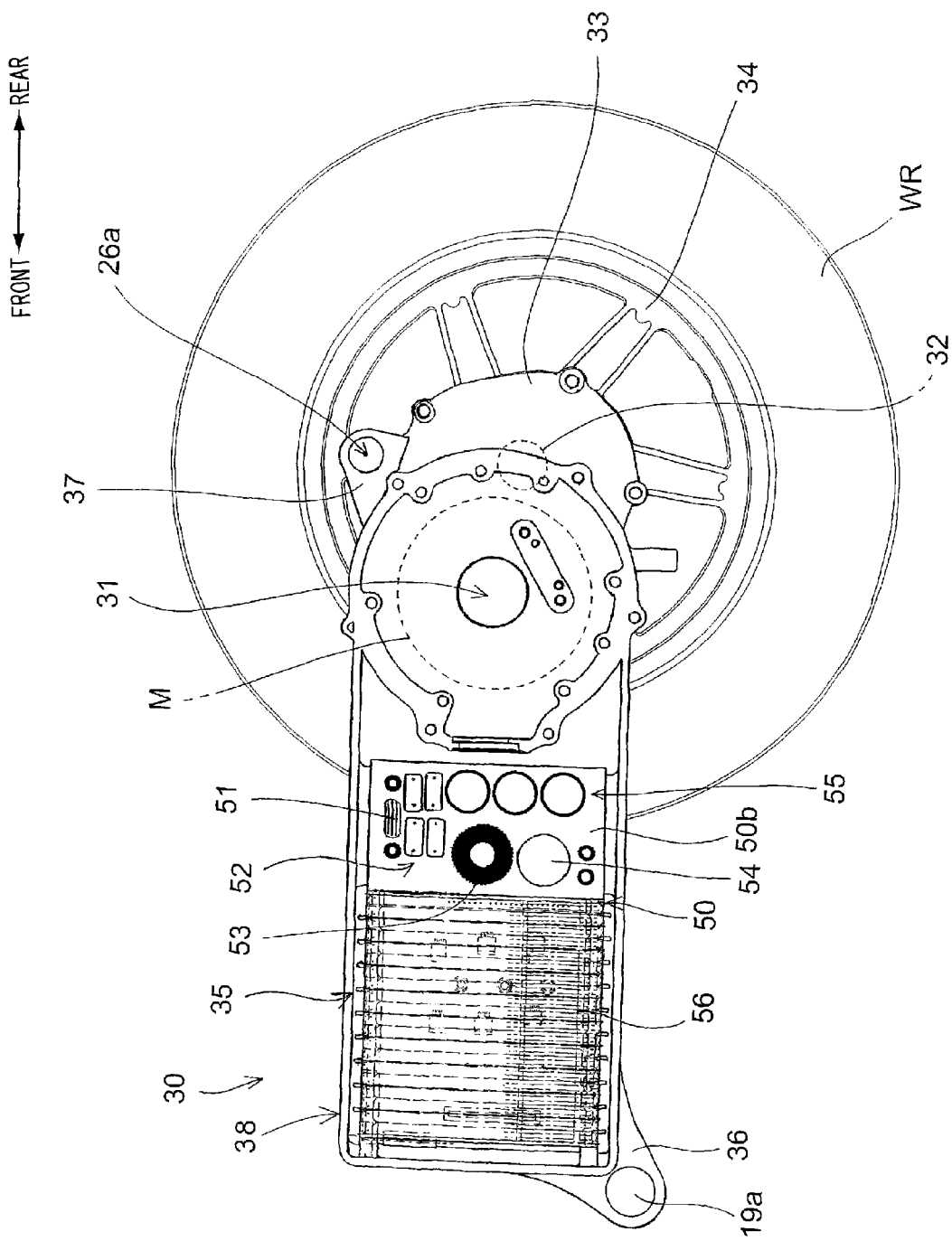
FIG. 2 is an enlarged side view of a swing arm.
Figure 3:
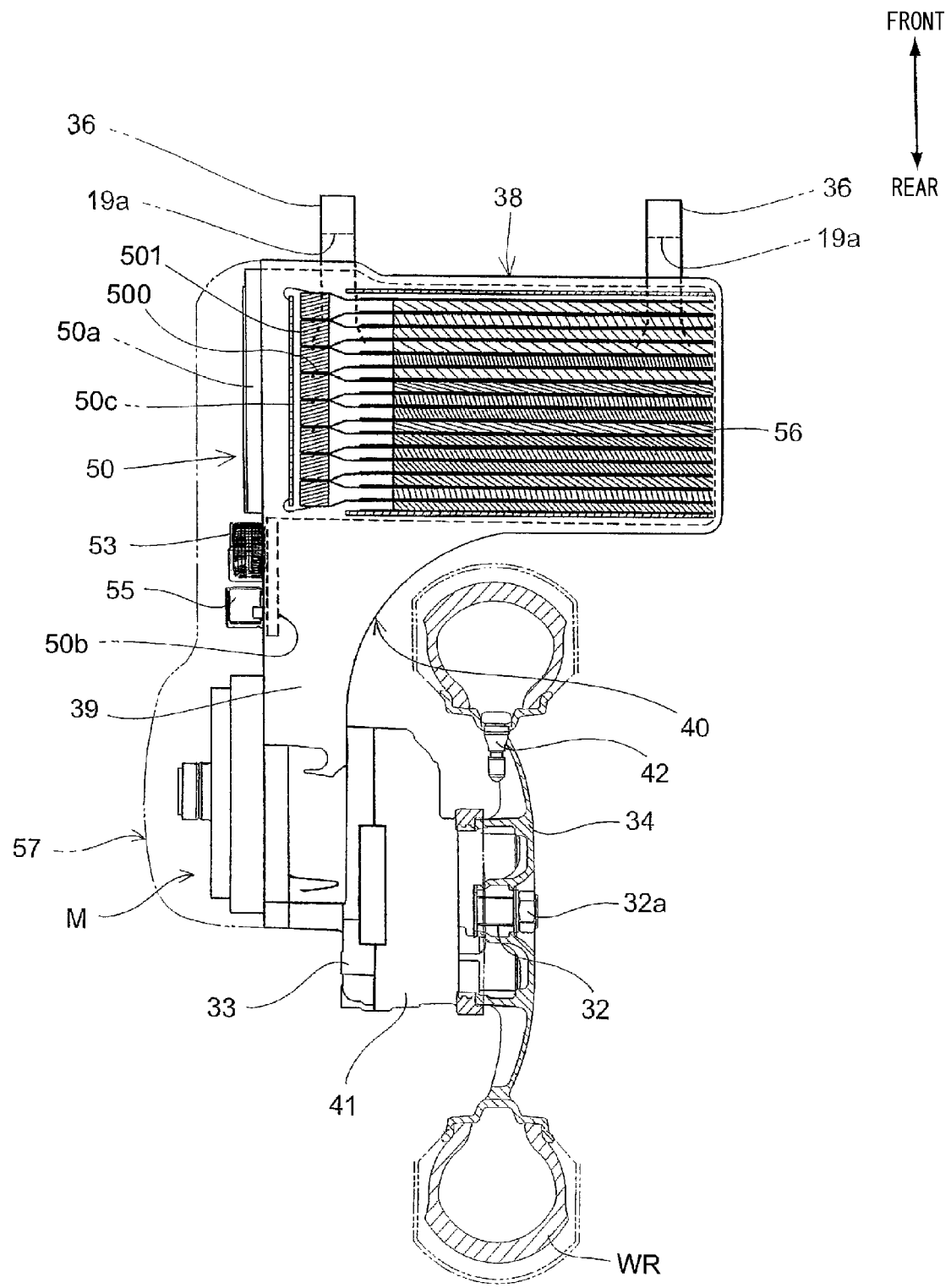
FIG. 3 is a top view of the swing arm.
Figure 4:
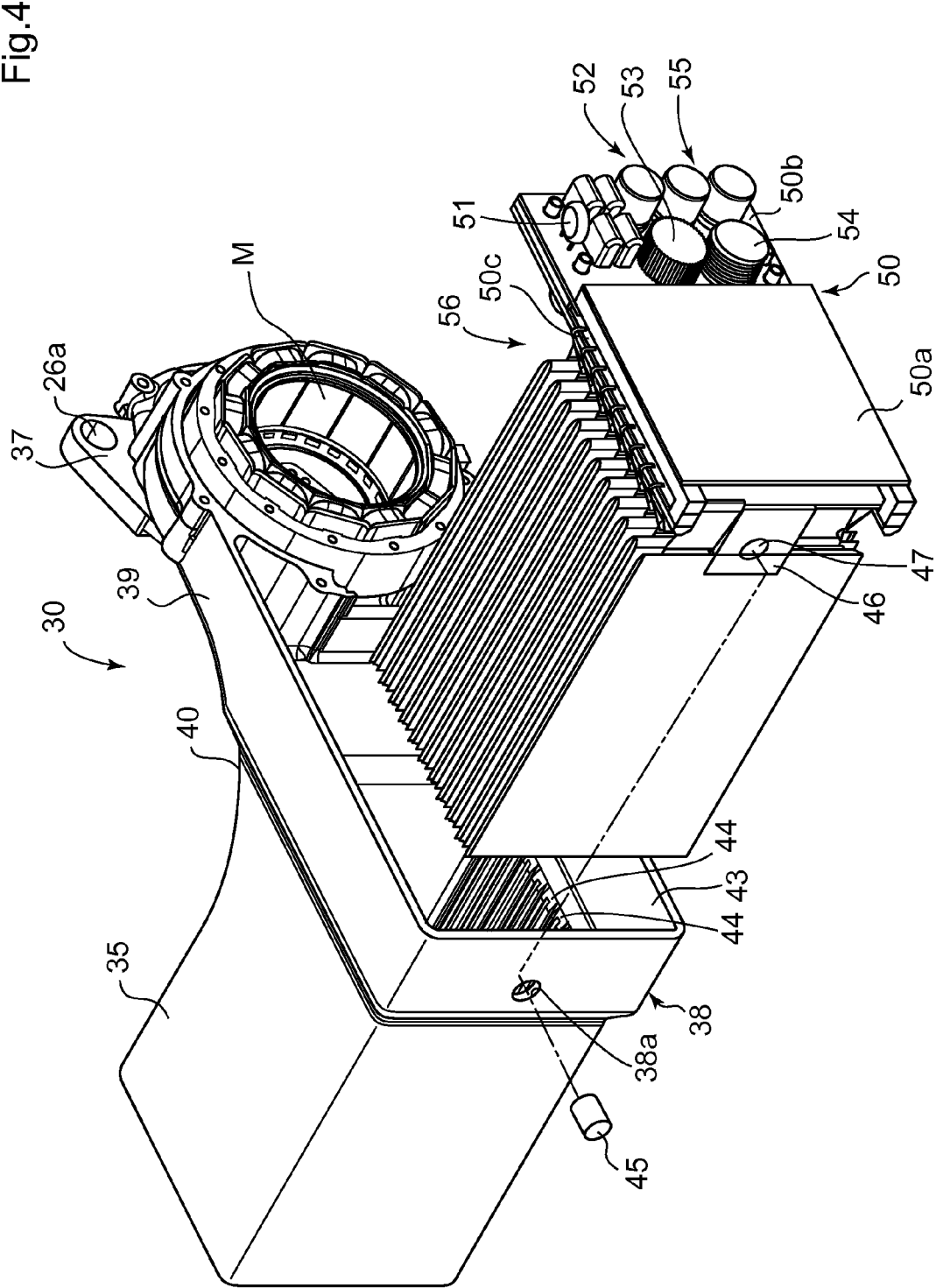
FIG. 4 is an exploded perspective view of the swing arm.

FIG. 2 is an enlarged side view of the swing arm 30. Moreover, FIG. 3 is a top view of the swing arm 30, and FIG. 4 is an exploded perspective view of the swing arm 30. The same reference signs as the above denote the same or equivalent parts. As described above, the swing arm 30 is a partially hollow structure made of a metal such as aluminum, and provided as a cantilever type that supports the rear wheel WR by an arm portion 39 provided on the left side in the vehicle width direction. In a lower portion on a side forward of the vehicle body with respect to the swing arm 30, a pair of left and right pivot flanges 36 each formed with a through-hole 19a for the swing shaft 19 (refer to FIG. 1) are provided.

On a side upward of the vehicle body with respect to the pivot flanges 36, a storage space 35 into which the battery 56 consisting of a plurality of battery cells is inserted is formed, and a wide case portion 38 that forms an outer shell portion of the storage space 35 and the arm portion 39 are continuously formed via a curved portion 40. At the left side in the vehicle width direction of the storage space 35 and the arm portion 39, a thin plate-like swing arm cover 57 that covers the board 50 and the electric motor M in an integrated manner is attached.

To a rear end portion of the arm portion 39, reduction gear cases 33, 41 in which reduction gears that reduce the rotation speed of the electric motor M is stored are attached. The axle 32 projects toward the right side in the vehicle width direction from the reduction gear case 41, and to an end portion of the axle 32, a wheel 34 of the rear wheel WR is fixed by a nut 32a. A tubeless tire is used for the rear wheel WR, and an air valve 42 is provided on the wheel 34. Moreover, on the reduction gear case 33, a mounting flange 37 formed with a through-hole 26a for attaching the rear cushion 26 (refer to FIG. 1) is provided.

The battery 56 according to the present embodiment has a module structure configured so as to obtain a predetermined high voltage by connecting a plurality of battery cells. The plate-like battery cells, which have been laminated with their planar portions oriented in the front-rear direction of the vehicle body, are stored in the storage space 35 having a substantially rectangular parallelepiped shape formed in the wide case portion 38. Accordingly, the battery 56 being a heavy object is disposed close to the swing shaft 19 of the swing arm 30, and the moment of inertia during swinging of the swing arm 30 is reduced to allow a smooth swing motion. Moreover, the battery cells are provided as a laminate type where each cell is packed with a soft laminate sheet. By the laminate-type battery, not only can a high energy density and an improvement in heat dissipation performance be expected, but an attaching operation to the swing arm 30 and a battery replacement operation are also facilitated.

The board 50 serving as a control device according to the present embodiment is arranged close to the battery 56 on the left side in the vehicle width direction thereof The board 50 consists of a control board 50a, a heating element board 50b, and an aluminum board 50c, and which are disposed so that their respective planar portions are oriented in the vehicle width direction. The control board 50a is disposed close to the battery 56 on the left side in the vehicle width direction thereof, and the heating element board 50b is coupled to a side rearward of the vehicle body of the control board 50a. The aluminum board 50c is disposed close to the battery 56 on the left side in the vehicle width direction thereof.

Between the battery 56 and the aluminum board 50c, a sponge rubber 501 having a predetermined thickness width is disposed. In the sponge rubber 501, a plurality of slits for inserting a plate-like terminal 500 provided at the left end portion in the figure of each battery cell are formed. As a result of inserting the plate-like terminal 500 into each slit, the position of the plate-like terminal is defined. Moreover, by the sponge rubber 501, the usage of a potting material 59 (refer to FIG. 5) during a potting process to be described later can be reduced for a reduction in weight of the swing arm 30. The aluminum board 50c is disposed close to the sponge rubber 501.

On the control board 50a, elements with small heat capacities, such as signal elements and semiconductors (FETs), are mainly mounted. On the other hand, on the heating element board 50b, elements having large calorific values, such as a thermistor 51, a group of input/output filters 52 for a charger, a charger power factor improving capacitor (PFC circuit) 53, a charger DC-converting capacitor (AC-DC transformer) 54, and a group of various transformers (including a DC-DC transformer) 55, that is, heating elements are mounted. Also on the aluminum board 50c, semiconductor elements etc., having smaller calorific values than that of the heating elements mounted on the heating board 50b are disposed. Thus, providing a heating element board 50b on which only heating elements having large calorific values are disposed in a concentrated manner allows a reduction in a heat load of heat generation of the heating elements to be applied to other elements. Moreover, separating the position to arrange heating elements from the position to arrange other control elements allows an increase in the degree of freedom of layout of the pivot flanges 36 and the through-holes 19a, etc.

Moreover, by disposing the heating element board 50b on the side rearward of the vehicle body with respect to the control board 50a, effect of the thermal influence of the heating elements on the control board 50a located on the upstream side in the vehicle-body traveling direction can be prevented. Further, as a result of the control board 50a being disposed on the outside of the battery 56 in the vehicle width direction, the thickness in the vehicle width direction can be reduced. Also, because the heating board 50b is arranged at a position to overlap with the rear wheel WR in a side view of the vehicle body, the heating elements can be arranged, taking advantage of a space formed between the battery 56 and the electric motor M, so that an excessively long swing arm length can be prevented.

Moreover, as shown in FIG. 4, the battery 56, as a result of a predetermined number of cell plates being laminated in the front-rear direction of the vehicle body, shows a substantially rectangular parallelepiped shape where its longitudinal direction is oriented in the vehicle width direction, and is stored in the storage space 35 of the wide case portion 38. On an inner surface 43 of the storage space 35, guide grooves 44 to store the respective plate-like battery cells at predetermined positions, respectively, are formed.

In the wide case portion 38, a through-hole 38a into which a sealing plug 45 is fitted is formed. On the other hand, in a coupling plate 46 that couples the battery 56 and the board 50 in a position forward of the vehicle body, a through-hole 47 into which the sealing plug 45 is fitted is formed. The sealing plug 45 and the through-holes 38a, 47 are used in a "resin potting process" that is performed during assembly of the swing arm 30. The potting process is for physically fixing the battery 56 and the board 50 to the swing arm 30 as well as obtaining insulation and vibration isolation of the board 50, and further increasing heat dissipation of the respective portions.

Figure 5:
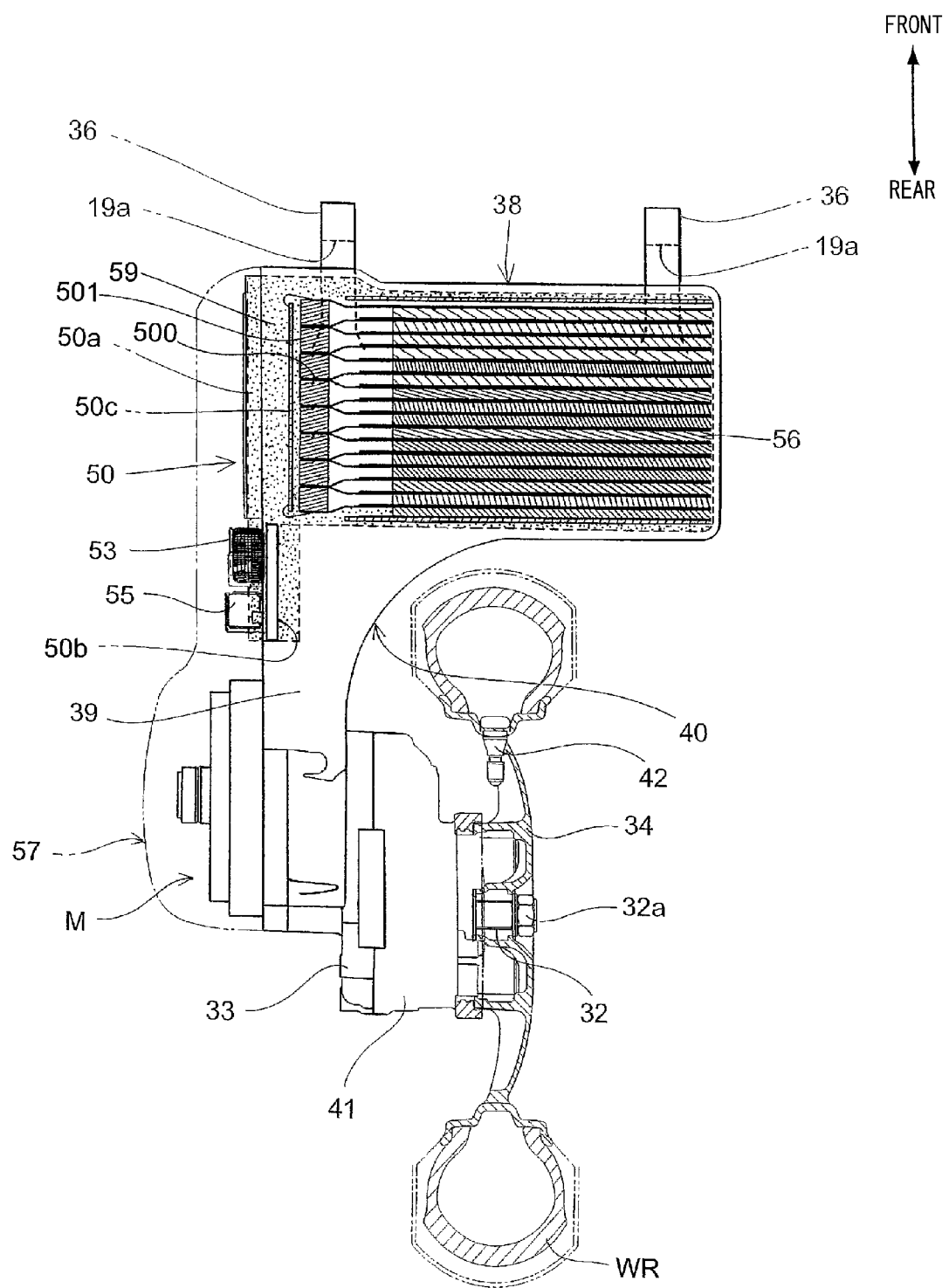
FIG. 5 is a top view of the swing arm after potting process.

The potting process is performed by inserting the battery 56 and the board 50 into the wide case portion 38, performing positioning by fitting the sealing plug 47 into the through-holes 38a, 47, and then pouring the potting material 59 made of a liquid resin that hardens over time around the battery 56, with an opening portion of the wide case 38 facing upward. The potting material 59 is injected, as shown in FIG. 5, so as to cover the control board 50a and the aluminum board 50c and cover a part on the side of a mounting surface of the capacitor 53, the group of various transformers 55, etc., mounted on the heating element board 50b. The potting material 59 also has a function of increasing heat dissipation of the battery 56 etc.

Then, by removing the sealing plug 45 after the potting material 59 hardens, a communication hole that communicates the inside with the outside of the wide case portion 38 is formed at the position where the sealing plug 45 existed. By the communication hole, even when a gas is discharged from the battery 56, the gas is smoothly discharged to the outside, so that a rise in the pressure in the swing arm 30 can be prevented.

Figure 6:
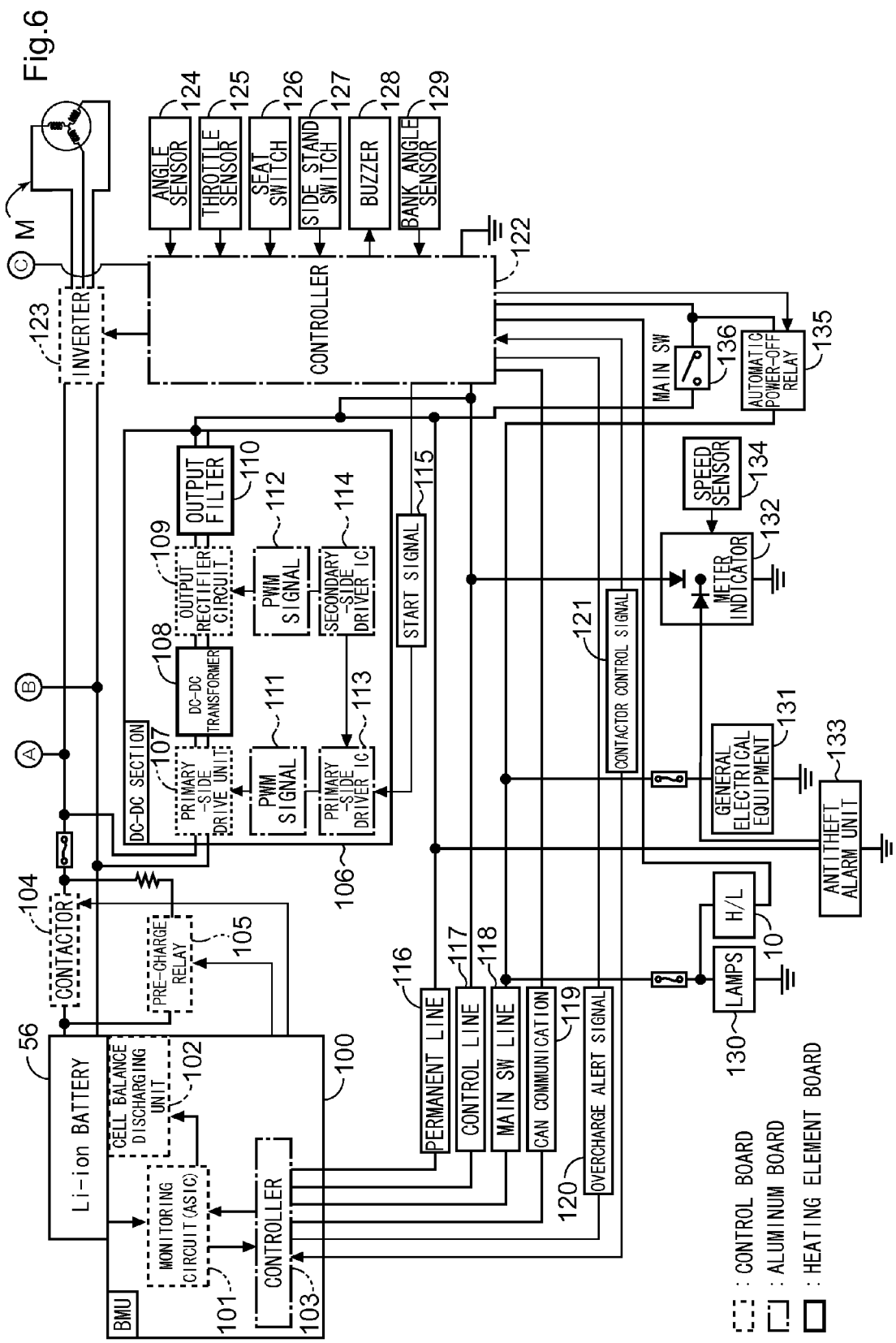
FIG. 6 is a block diagram showing a whole configuration of an electrical system to be applied to the electric motorcycle.
Figure 7:
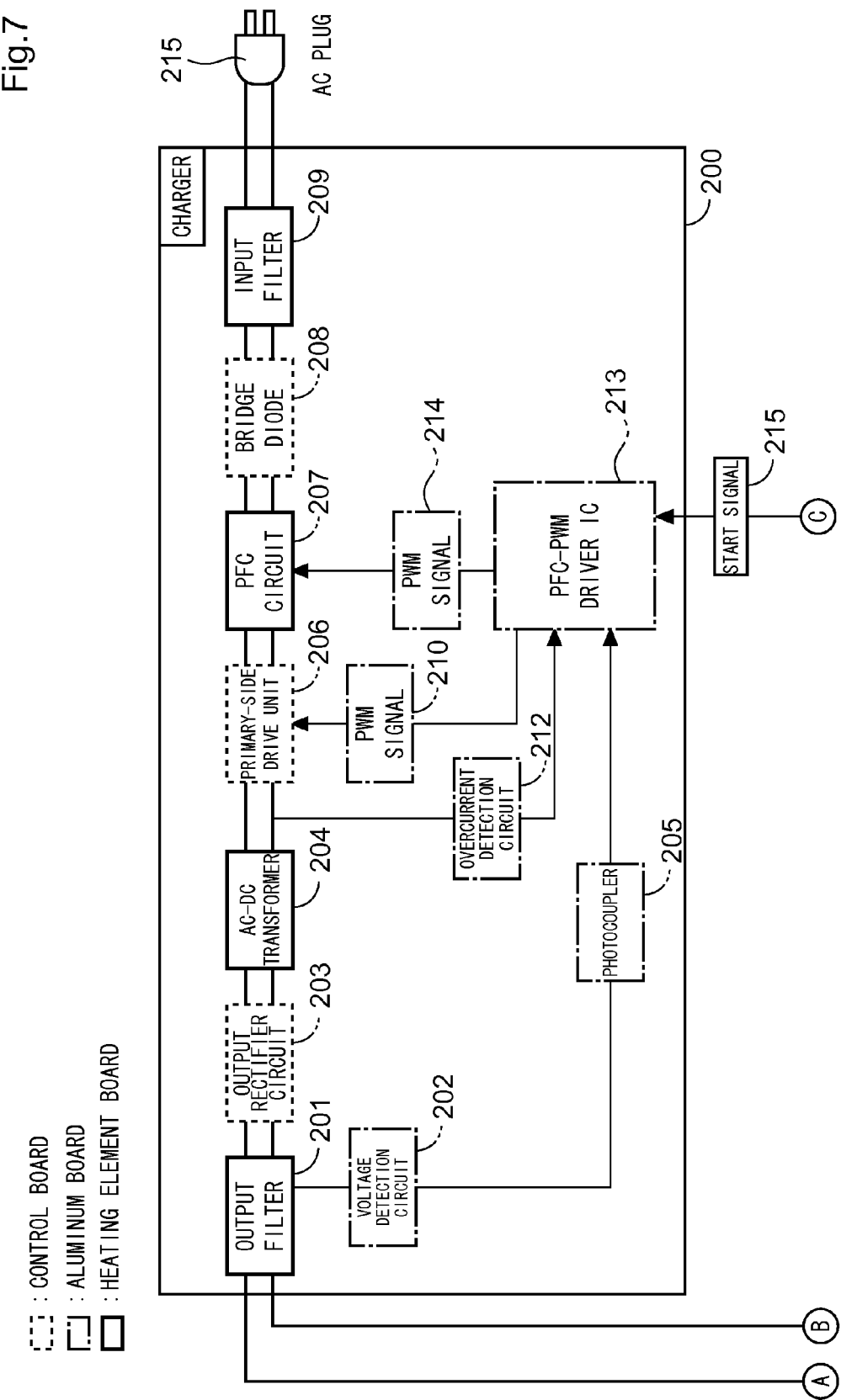
FIG. 7 is a block diagram showing a configuration of a component circuitry of only a charger of an electrical system to be applied to the electric motorcycle.

FIG. 6 and FIG. 7 are block diagrams showing a configuration of an electrical system to be applied to the electric motorcycle 1. The same reference signs as the above denote the same or equivalent parts. FIG. 7 shows a component circuit of only a charger, and FIG. 6 shows an overall configuration other than the same. In FIGS. 6 and 7, elements mounted on the control board 50a are shown by "broken lines," elements mounted on the aluminum board 50c are shown by "alternate long and short dashed lines," and elements mounted on the heating element board 50b are shown by thick "solid lines."

On the control board 50a, elements for control signals in which a small current flows are mounted. These elements generate little heat, and the control board 50a is formed by a glass epoxy board. Moreover, on the aluminum board 50c, elements in which a large current flows and which are incapable of self-heat dissipation are mainly mounted. Examples of these electronic components include a semiconductor element (FET, diode), a resistor, and a film capacitor, and these are increased in heat dissipation by being mounted on the highly heat-conductive aluminum board 50c. Further, on the heating element board 50b, large-sized electronic components in which a large current flows and which are capable of self-heat dissipation are mainly mounted. Examples of these electronic components include an inductor, a transformer, and an electrolytic capacitor, and the heating element board 50b is arranged at a position where the influence of battery heat is unlikely to be received to obtain an improvement in heat dissipation.

Also, in the block diagrams of FIGS. 6 and 7, elements mounted on the heating element board 50b are an input filter 209 and an output filter 201 (corresponding to the above-described group of input/output filters 52), a PFC circuit 207 (corresponding to the above-described charger power factor improving capacitor 53), and an AC-DC transformer 204 (corresponding to the above-described charger DC-converting capacitor 54) of the charger 200 and a DC-DC transformer 108 (corresponding to the above-described group of various transformers 55) and an output filter 110 of a DC-DC section 106.

Referring to FIG. 6, the lithium ion battery 56 is electrically connected to an input side of an inverter 123 via a contactor 104, and an output side of the inverter 123 is connected to the electric motor M by a three-phase alternating current line. To the contactor 104 that is on/off controlled by a mechanical contact that operates with an electromagnetic force, a pre-charge relay 105 that prevents a surge in supply current is connected in parallel.

A BMU (Battery Management Unit) 100 includes a monitoring circuit (ASIC) 101 for the voltage, temperature, etc., of the battery 56, a cell balance discharging unit 102 for correcting a variation in the capacity of battery cells, and a controller 103 that controls these.

Between the controller 103 in the BMU 100 and a controller 122 serving as a control device for controlling the inverter 123, respective lines for a permanent system 116, a control system 117, a main switch system 118, and CAN communication 119 are arranged. Moreover, an overcharge alert signal 120 is transmitted from the controller 103 of the BMU 100, and a contactor control signal 121 is transmitted from the controller 122 of the inverter 123.

To the controller 122 of the inverter 123, sensor signals are input from an angle sensor 124 that detects the rotation angle of the electric motor M, a throttle sensor 125 that detects the throttle operation amount by a rider, a seat SW (switch) 126 that detects whether the rider is seated on the seat 20, a side stand SW 127 that detects whether a side stand (not shown) of the electric vehicle 1 is retracted, and a bank angle sensor 129 that detects the inclination (bank angle) of the electric vehicle. A buzzer 128 serving as an alarm is actuated in response to an actuation signal from the controller 122 when an overdischarged state or the like of the battery 56 is detected.

The permanent line 116 is connected to the DC-DC section 106 that converts a large current supplied from the battery 56 to a control current. The DC-DC section 106 includes a primary-side drive unit 107, a DC-DC transformer 108, an output rectifier circuit 109, an output filter 110, a primary-side driver IC 113 that supplies a PWM signal to the primary-side drive unit 107, and a secondary-side driver IC 114 that supplies a PWM signal to the output rectifier circuit 109. To the primary-side driver IC 113, a start signal 115 is supplied from the controller 122. Moreover, to the permanent line 116, one-end sides of an antitheft alarm unit 133 and a main SW 136 are connected.

The control line 117 is connected to the controller 122 of the inverter 123. To the control line 117, one end of a meter indicator 132 serving as an actuation indicator lamp of the antitheft alarm unit 133 is connected. Moreover, the meter indicator 132 is connected with a speed sensor that detects a vehicle speed, and the meter indicator 132 is arranged so as to function as a speed warning lamp when the vehicle speed exceeds a predetermined value.

To the main SW line 118, lamps 130 such as blinkers, a headlight (H/L) 10, and general electrical equipment 131 such as a battery cooling fan. An end portion of the main SW line 118 is connected to an automatic power-off relay 135 that enables actuation of the headlight 10 etc., under a predetermined condition even if the main SW 136 is turned off.

Referring to FIG. 7, to the charger 200, input and output lines (A, B) of a direct current to be connected to the battery 56 and an AC plug 215 to be connected to a commercial alternating current power supply, or the like are connected. The charger 209 includes an input filter 209, a bridge diode 208, a PFC circuit 207 serving as a power factor improving circuit, a primary-side drive unit 206, an AC-DC transformer 204, an output rectifier circuit 203, and an output filter 201. A signal of an overcurrent detection circuit 212 disposed between the primary-side drive unit 206 and the AC-DC transformer 204 is input to a PFC-PWM driver IC 213. On the other hand, a signal of a voltage detection circuit 202 connected to the output filter 201 is input to a PFC-PWM driver IC 213 via a photocoupler 205. The PFC circuit 207 and the primary-side drive unit 206 are driven by PWM signals 210, 214 output from the PFC-PWM driver IC 213, respectively. To the PFC-PWM driver IC 213, a start signal 215(c) from the controller 122 of the inverter 123 is input.

Figure 8:
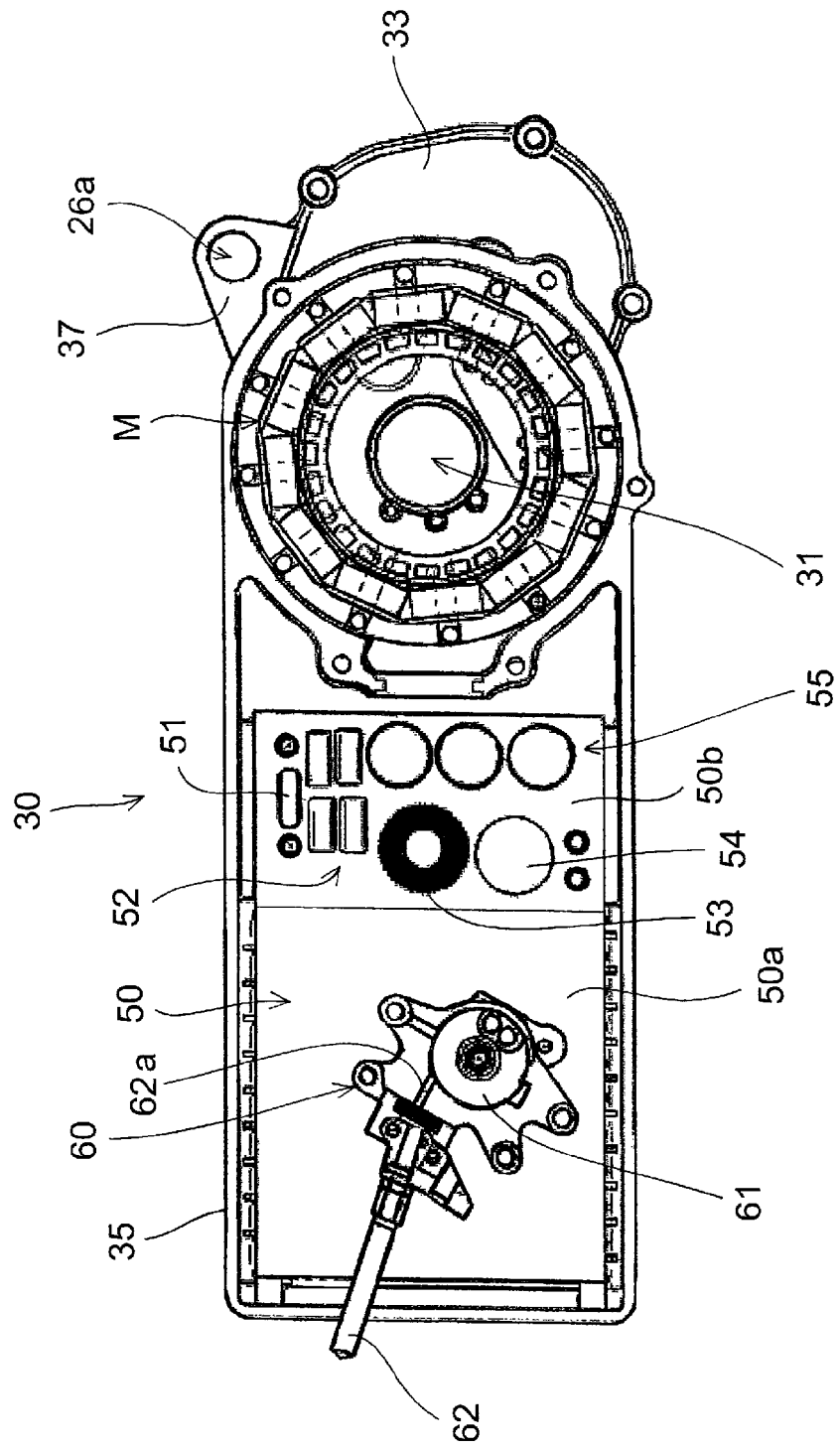
FIG. 8 is a side view of a swing arm according to a variation of an embodiment of the present invention.
Figure 9:
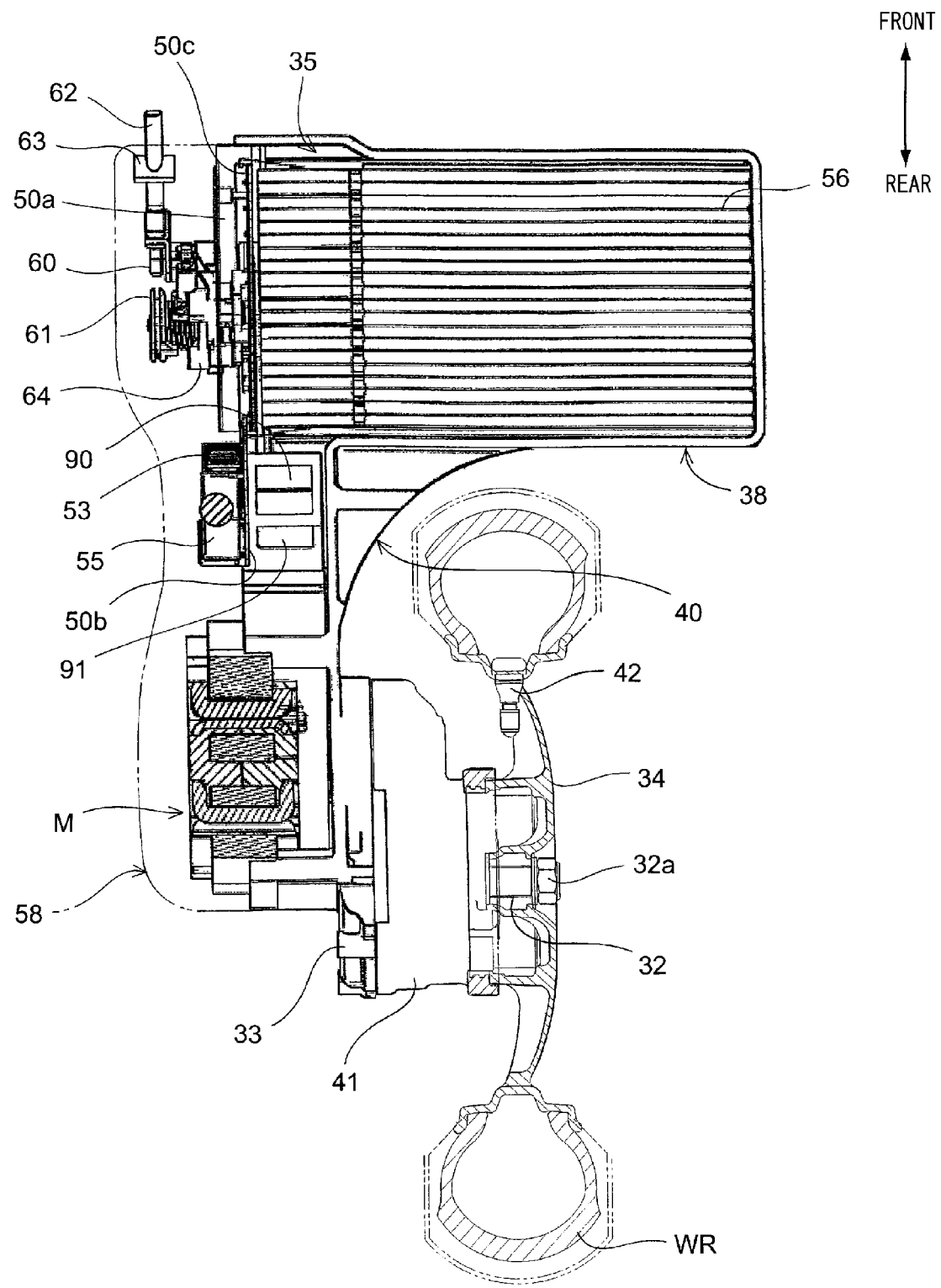
FIG. 9 is a top view of a swing arm according to a variation of an embodiment of the present invention.

FIG. 8 is a side view of the swing arm 30 according to a variation of an embodiment of the present invention. FIG. 9 is a top view of the same. The same reference signs as the above denote the same or equivalent parts. In this variation, heating elements 90, 91 are provided also on a surface that is inside of the heating board 50b in the vehicle width direction, while the heating elements 90, 91 are arranged so as to be stored in an interior space of the curved portion 40. According to this arrangement, the heating elements can be arranged, taking advantage of the interior space of the curved portion 40 necessary for securing the joint strength between the arm portion 39 and the wide case portion 38.

Further, the present variation is characterized in that a throttle position sensor 60 that detects a rider's throttle operation is attached to a surface at the left side in the vehicle width direction of the control board 50a located on a side forward of the vehicle body out of the control board 50a and the heating element board 50b to form the board 50, that is, the outside in the vehicle width direction. The throttle position sensor 60 corresponds to the throttle sensor 125 shown in FIG. 6.

The throttle position sensor 60 is a rotary sensor for detecting the throttle operation amount by a rider according to a rotation angle of a pulley 61 joined to an inner wire 62a of a throttle cable 62, and is attached to the control board 50a so that its sensor shaft 65 (refer to FIG. 10) is oriented in the vehicle width direction.

The other end portion of the inner wire 62a of the throttle cable 62 is coupled to a throttle grip (refer to FIG. 12) attached to the steering handle 8 so as to be freely turntable, and accordingly, the pulley 61 is turned in response to a turning operation of the throttle grip. In the throttle cable 62 having a length from the throttle grip to a front end portion of the swing arm 30, a bend, vibration, etc., occur in response to a swinging operation of the swing arm 30, but this exerts no influence on the throttle operation because the throttle cable 62 originally has a structure that can respond to a turning operation of the steering handle.

As described above, according to the arrangement of attaching the throttle position sensor 60 to the control board 50a in the swing arm, the sensors can be disposed in a concentrated manner on the board, and a component to be fixed to a throttle grip part or the like can be eliminated. Moreover, because there is no throttle position sensor disposed near the throttle grip, a simple external appearance can be provided in the vicinity of the throttle. Moreover, it is not necessary to connect the throttle position sensor and the control unit by a long wiring, so that the structure can be simplified.

Moreover, a swing arm cover 58 that is attached on the left side in the vehicle width direction of the swing arm 30 also covers the throttle position sensor 60 attached to the control board 50a. Also, the throttle cable 62 is led forward of the vehicle body through a grommet 63 engaged with a through-hole formed in the swing arm cover 58. The grommet 63 serving as a support member is formed of rubber or the like to maintain hermetic sealing of the throttle cable 62 and the swing arm cover 58, so that entry of moisture etc., into the swing arm 30 can be prevented.

Moreover, the throttle position sensor 60 is accordingly disposed close to the swing shaft 19 of the swing arm 30, so that a cable coupled to the throttle position sensor 60 becomes unlikely to receive the influence of a swinging operation of the swing arm 30. Moreover, as a result of the throttle position sensor 60 being arranged closer to the front end of the swing arm 30, the length of the throttle cable 62 to connect with the throttle grip of the steering handle 8 can be reduced.

Figure 10:
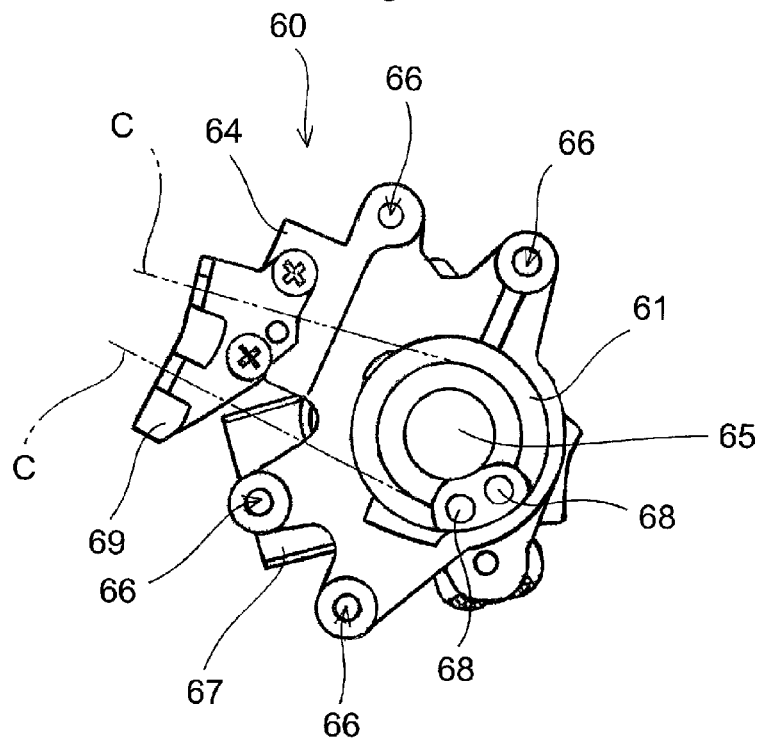
FIG. 10 is a front view of a throttle position sensor.
Figure 11:
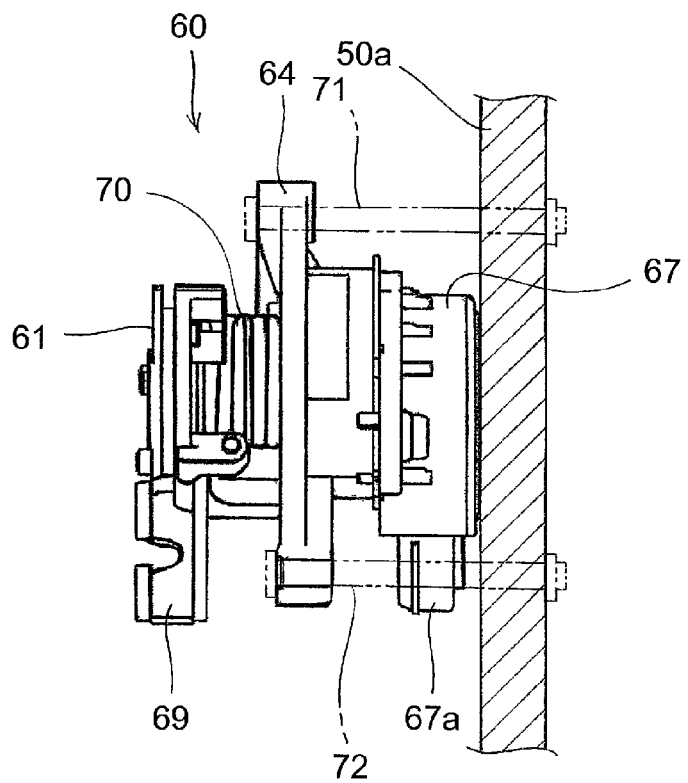
FIG. 11 is a side view of the throttle position sensor
Figure 12:
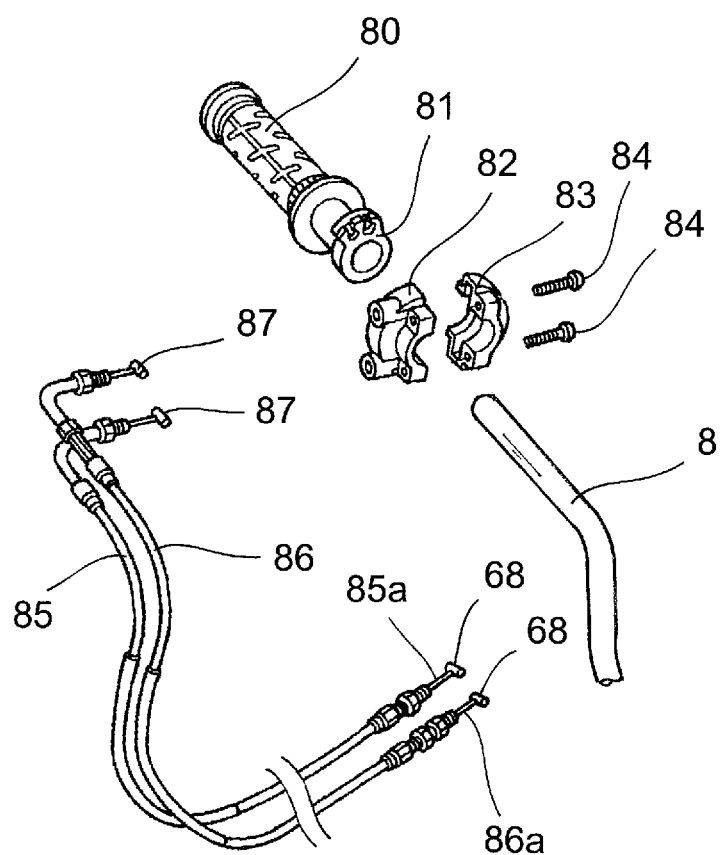
FIG. 12 is a perspective view showing a configuration of throttle cables to couple a throttle grip with the throttle position sensor.

FIG. 10 is a front view of the throttle position sensor 60. Moreover, FIG. 11 is a side view of the same, and FIG. 12 is a perspective view showing a configuration of throttle cables to couple a throttle grip 80 with the throttle position sensor 60. In FIGS. 8 and 9, a single-side pulling method in which the pulley 61 of the throttle position sensor 60 is pulled by a single wire is shown, while in FIGS. 10 to 12, a double-side pulling method in which the pulley 61 is turned by two throttle cables 85, 86.

The throttle position sensor 60 is attached to a surface at the left side in the vehicle width direction of the control board 50a by use of mounting bolts 71, 72 that penetrate through through-holes 66 formed in its main body portion 64. On the main body portion 64, a sensor shaft 65 is turnably supported about an axis, and the pulley 61 is fixed to the sensor shaft 65. To the transmission means for coupling the throttle grip 80 and the throttle position sensor 60, two throttle cables 85, 86 formed by inserting inner wires 85a, 86a through flexible outer tubes are applied.

At both end portions of the inner wire 85a, 86a, stoppers 87, 68 are attached, respectively. To the throttle grip 80, a grip-side pulley 81 is fixed, so that a turning operation of the throttle grip 80 is transmitted to the wires by engaging the stoppers 87 with the grip-side pulley 81. The grip-side pulley 81 is stored in handle fixing members 82, 83 and fixed to a handlebar 8 by fixing screws 84. According to this arrangement, because no throttle position sensor exists near the handle grip, a simple external appearance can be provided in the vicinity of the throttle grip.

The stoppers 68 attached to the other end portions of the inner wires 85a, 86a are respectively engaged with the pulley 61 of the throttle position sensor 60. Moreover, to the main body portion 64 of the throttle position sensor 60, a guide plate 69 for guiding the two throttle cables in predetermined directions C as shown by alternate long and two short dashed lines is attached.

The pulley 61 is biased in a direction to always close the throttle grip 80 (direction in which the throttle opening degree becomes zero) by a return spring 70. Moreover, because the pulley 61 is arranged at an end portion of the left side in the vehicle width direction, wire attachment/detachment and backlash adjustment in maintenance is easy. Further, the pulley 61 is disposed at an end portion of the left side in the vehicle width direction, and inside thereof a sensor unit 67 provided with an output connector 67a for a sensor signal is arranged, so that the sensor unit 67 becomes unlikely to receive the influence of disturbance etc. Moreover, because the throttle position sensor 60 is directly attached to the control board 50a, wiring therebetween is shortened, which allows an increase in the degree of freedom of layout and vibration resistance.

Also, the shapes and structures of the electric motorcycle, swing arm, boards, battery, and throttle position sensor, the arranging positions and support structures of the boards, and the types, shapes, etc., of the control elements or heating elements mounted on the boards are not limited to those of the above-described embodiment, and various modifications can be made. For example, the arm portion of the swing arm may be provided as a cantilever type on the right side in the vehicle width direction, and the control board and heating element board may be disposed on this side of the arm portion. The boards, throttle position sensor, etc., according to the present invention can be applied to various types of vehicles such as saddle type three-wheeled vehicles, without limitation to electric motorcycles.

REFERENCE SIGNS LIST

1: electric motorcycle,
2: vehicle body frame,
8: steering handle,
19: swing shaft,
30: swing arm,
32: axle,
35: storage space,
38: wide case portion,
39: arm portion,
40: curved portion,
50: board (control device),
50a: control board,
50b: heating element board,
50c: aluminum board,
56: battery,
57, 58: swing arm cover,
60: throttle position sensor (throttle position detecting device),
61: pulley,
65: sensor shaft,
80: throttle grip,
62, 85, 86: throttle cable (transmission means),
62a, 85a, 86a: inner wire (support member),
63: grommet,
M: electric motor,
WR: rear wheel

The invention claimed is:

1. A control device of an electric motorcycle having a swing arm that pivotally supports a rear wheel of the electric motorcycle and that is freely swingably attached to a vehicle body of the electric motorcycle, wherein a battery and an electric motor for driving the rear wheel are equipped inside of the swing arm, the swing arm being a cantilever swing arm that pivotally supports the rear wheel by a single arm portion of the swing arm, the battery being disposed in the swing arm at a position closer to a front of the vehicle body and close to a through-hole of a swing shaft that pivotally supports the swing arm on the vehicle body so as to be freely swingable, the electric motor being disposed in the swing arm at a position closer to a rear of the vehicle body and close to an axle of the rear wheel, the control device of the electric motorcycle including a board serving as the control device that is disposed such that a planar portion of the board is oriented in a vehicle width direction of the electric motorcycle, wherein the board includes a control board which has a control element having a small calorific value and a drive circuit for controlling the electric motor disposed on the control element, and a heating element board which has a heating element having a large calorific value and a charging circuit for charging the battery disposed on the heating element, wherein the control board is disposed at a position outside of the battery in the vehicle width direction, and wherein the heating element board is disposed at a position rearward of the control board with respect to the vehicle body and forward of the electric motor with respect to the vehicle body.

2. The control device according to claim 1, wherein the heating element board is disposed close to the control board rearward of the control board with respect to the vehicle body.

3. The control device according to claim 2, wherein the heating element is mounted on a surface of the heating element board.

4. The control device according to claim 3, wherein the heating element is stored in a curved portion that couples an outer shell portion of a storage space for the battery and the arm portion with each other.

5. The control device according to claim 2, wherein the heating element board is disposed at a position to overlap with the rear wheel in a side view of the vehicle body.

6. The control device according to claim 2, wherein the battery is formed in a substantially rectangular parallelepiped shape with a longitudinal direction of the battery oriented in the vehicle width direction, and the control board, with its planar portion oriented in the vehicle width direction, is disposed close to one longitudinal end surface of the battery.

7. The control device according to claim 2 wherein the battery is an assembly of laminate batteries where cells of the battery are packed with a soft laminate sheet.

8. The control device according to claim 1, wherein the heating element is mounted on a surface of the heating element board.

9. The control device according to claim 8, wherein the heating element is stored in a curved portion that couples an outer shell portion of a storage space for the battery and the arm portion with each other.

10. The control device according to claim 1, wherein the heating element board is disposed at a position to overlap with the rear wheel in a side view of the vehicle body.

11. The control device according to claim 1, wherein the battery is formed in a substantially rectangular parallelepiped shape with a longitudinal direction of the battery oriented in the vehicle width direction, and the control board, with its planar portion oriented in the vehicle width direction, is disposed close to one longitudinal end surface of the battery.

12. The control device according to claim 1 wherein the battery is an assembly of laminate batteries where cells of the battery are packed with a soft laminate sheet.

* * * * *